Sept. 5, 1950     S. W. LACK     2,521,637
REDUCING VALVE MECHANISM
Filed March 9, 1949
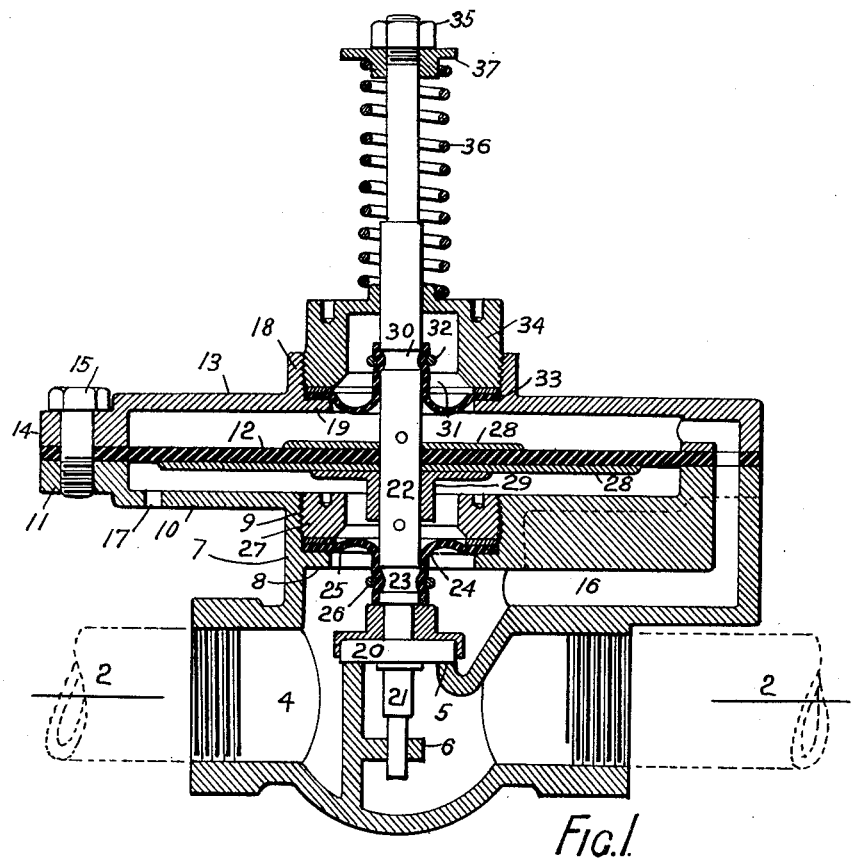
Fig.1
Fig.2
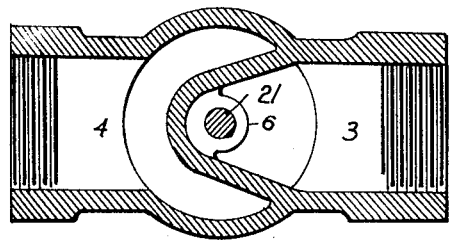
Inventor:
Sydney Walter Lack
by his Attorneys
Howson & Howson Patented Sept. 5, 1950

2,521,637

UNITED STATES PATENT OFFICE 2,521,637

REDUCING VALVE MECHANISM

Sydney Walter Lack, Waverley, near Sydney, New South Wales, Australia

Application March 9, 1949, Serial No. 80,496
In Australia March 17, 1948

1 Claim. (Cl. 50—23)

This invention has been devised to provide a reducing valve mechanism wherein a valve controlling delivery from a high pressure line to a low pressure line is actuated by a spring conjointly with the pressure medium in the low pressure line acting on a diaphragm connected to the valve stem. Difference in pressure between the high pressure line and the low pressure line is regulated by spring adjustment and the valve is then actuated to maintain a desired pressure in the low pressure line when the low pressure acting on the diaphragm falls below a determined pressure.

A feature of the invention is the provision of flexible sealing means for the openings through which the valve stem moves in place of glands and stuffing boxes, said flexible sealing means permitting a freer movement of the valve than would be the case where glands and stuffing boxes are employed.

The reducing valve mechanism of this invention consists of a valve chest with a valve seat therein. There is a high pressure inlet on one side of the valve seat and a low pressure outlet on the other side of the valve seat. A valve in register with the valve seat has its stem projecting through a diaphragm chamber mounted on the valve chest. A diaphragm in said chamber is affixed to the valve stem. There is a port communicating between the low pressure part of the valve chest and that part of the diaphragm chamber where the low pressure medium will exert pressure on the diaphragm in a valve closing direction. A valve opening spring is mounted on the valve stem outside the diaphragm chamber and means are provided to regulate the spring loading. The openings in the valve chest and in the diaphragm chamber through which the valve stem passes are sealed by two flanged sleeve members of flexible material which are affixed to the valve stem and to the respective parts of the valve chest and the diaphragm chamber in such manner as will permit substantially free movement of the valve.

An embodiment of the invention is illustrated in the annexed drawings wherein Fig. 1 is a sectional elevation of the reducing valve mechanism; Fig. 2 is a sectional plan on line 2—2 of Fig. 1.

The valve chest has a high pressure inlet 3 at one end and a low pressure outlet 4 at the other end. The inlet and the outlet each have means for connecting pipes thereto. There is a valve seat 5 in the valve chest arranged to separate the inlet and outlet. Below the valve seat, that is on the high pressure side, there is a lug 6 which is drilled to constitute a guide for a valve stem. Above the valve seat, that is on the low pressure side, the valve chest has an open cylindrical body 7 with an internal shoulder 8 formed thereon and above the shoulder 8 the cylindrical body is threaded as indicated at 9. Above the cylindrical body 7 the bottom part 10 of a diaphragm chamber is formed as an integral part of the valve chest. This part 10 is flanged as indicated at 11 to provide a seating for a diaphragm 12 and the top part 13 of the diaphragm chamber which has a corresponding flange 14 and is, with the diaphragm 12, fixed to the flange 11 by studs 15. There is a port 16 leading from the low pressure side of the valve chest to the top part of the diaphragm chamber and there is a vent 17 in the bottom part of the diaphragm chamber. The top part 13 of the diaphragm chamber has an opening therein in alignment with the cylindrical body 7. It is surrounded by a threaded boss 18 and at the bottom of the boss there is an inwardly projecting shoulder 19.

A valve 20 to register with the valve seat 5 has a bottom stem 21 projecting into the guide lug 6; it also has a top stem 22 which projects through the cylindrical body 7 and through the diaphragm chamber. The top stem 22 has a groove 23 formed therein at a position below the shoulder 8 in the cylindrical body 7. A flexible sealing member made as a sleeve 24 with a flange 25 at the top is mounted on the top stem 22 by a clamp ring 26 pressing the sleeve into the groove 23. The flange 25 is secured on the shoulder 8 of the cylindrical body 7 by ring nut 27. In the diaphragm chamber the top stem 22 is secured to the diaphragm 12 by top and bottom plates 28 and supporting collar 29. These plates 28 prevent the formation of a "belly" in the diaphragm. The top stem 22 has a second groove 30 formed therein at a position above the shoulder 19 on the top part 13 of the diaphragm chamber. A flexible sealing member made as that described above has its sleeve 31 mounted on the top stem 22 by a clamp ring 32 pressing the sleeve into the groove 30. The flange 33 of this flexible sealing member is at the bottom and it is secured on the shoulder 19 on the top part 13 of the diaphragm chamber by ring nut 34. It will be seen that the construction of the flexible sealing members and associated parts is such that the flexible sealing members will not distort under normal conditions of use.

The top stem 22 passes through the ring nut 34 and the end is screwed to take a nut 35. This nut compresses a helical spring 36 between a spring keep 37 and the ring nut 34. A hood may be provided to cover the spring assembly.

I claim:

A reducing valve mechanism consisting of a valve chest with a valve seat therein and with a high pressure inlet on one side of the valve seat and a low pressure outlet on the other side of the valve seat, a valve stem guide below the valve seat, an open top cylindrical body on the low pressure side of the valve chest with an internal shoulder therein and a ring nut screwed into said cylindrical body, onto said internal shoulder; means defining a diaphragm chamber above said body having upper and lower parts each provided with a flange in confronting relation to each other, a diaphragm secured in said chamber by said flanges, said upper part of the diaphragm chamber having an opening therein in alignment with said body and surrounded by a threaded boss with an inwardly projecting flange at the bottom of the boss, a ring nut screwed into said boss, a port leading from the low pressure side of the valve chest to the top part of the diaphragm chamber, a vent in the bottom part of the diaphragm chamber; a valve in register with the valve seat having top and bottom stems, said top stem projecting through said cylindrical body and through said diaphragm chamber and being affixed to said diaphragm; flexible sealing means each constructed as a sleeve to fit on said top valve stem and having a flange whereby they are secured against said internal shoulder and said boss flange by the said ring nuts; and a valve opening spring mounted on said top valve stem with means to regulate the spring loading.

SYDNEY WALTER LACK.

REFERENCES CITED

The following references are of record in the file of this patent:

UNITED STATES PATENTS

| Number | Name | Date |
|---|---|---|
| 1,800,995 | Gaunt | Apr. 14, 1931 |
| 1,950,121 | McKee | Mar. 6, 1934 |

FOREIGN PATENTS

| Number | Country | Date |
|---|---|---|
| 539,744 | Germany | of 1930 |